US010474519B2

(12) United States Patent
Talwadker et al.

(10) Patent No.: US 10,474,519 B2
(45) Date of Patent: Nov. 12, 2019

(54) SERVER FAULT ANALYSIS SYSTEM USING EVENT LOGS

(71) Applicant: NetApp, Inc., Sunnyvale, CA (US)

(72) Inventors: Rukma Ameet Talwadker, Bangalore (IN); Ross Ackerman, Research Triangle Park, NC (US)

(73) Assignee: NetApp, Inc., Sunnyvale, CA (US)

( * ) Notice: Subject to any disclaimer, the term of this patent is extended or adjusted under 35 U.S.C. 154(b) by 14 days.

(21) Appl. No.: 14/857,346

(22) Filed: Sep. 17, 2015

(65) Prior Publication Data

US 2017/0083390 A1 Mar. 23, 2017

(51) Int. Cl.
*G06F 11/07* (2006.01)
*H04L 12/24* (2006.01)

(52) U.S. Cl.
CPC ........ *G06F 11/079* (2013.01); *G06F 11/0748* (2013.01); *G06F 11/0772* (2013.01); *G06F 11/0778* (2013.01); *G06F 11/0793* (2013.01); *H04L 41/069* (2013.01); *H04L 41/0645* (2013.01)

(58) Field of Classification Search
CPC .............. G06F 11/079; G06F 11/0793; G06F 11/0706; G06F 11/0787; H04L 41/0686; H04L 41/0631
See application file for complete search history.

(56) References Cited

U.S. PATENT DOCUMENTS

| 6,718,489 | B1 * | 4/2004 | Lee ..................... | G06F 11/0748 714/43 |
| 9,274,902 | B1 * | 3/2016 | Morley ............... | G06F 11/2002 |
| 2005/0172162 | A1 * | 8/2005 | Takahashi .......... | G06F 11/0709 714/4.4 |
| 2006/0085689 | A1 * | 4/2006 | Bjorsne .............. | G06F 11/0748 714/39 |
| 2006/0161819 | A1 * | 7/2006 | Nissan-Messing ......................... | G06F 11/0793 714/48 |
| 2007/0168049 | A1 * | 7/2007 | Rao ..................... | G06F 11/3031 700/11 |
| 2007/0168915 | A1 * | 7/2007 | Fabbio ................ | G06F 11/0709 717/101 |
| 2008/0307269 | A1 * | 12/2008 | Bennett ................ | G06F 11/079 714/47.2 |
| 2010/0095163 | A1 * | 4/2010 | Ishihara .............. | G06F 11/2215 714/47.1 |
| 2011/0099559 | A1 * | 4/2011 | Kache .................. | G06F 9/5061 719/318 |
| 2011/0276951 | A1 * | 11/2011 | Jain ..................... | G06F 11/3006 717/140 |

(Continued)

Primary Examiner — Yolanda L Wilson
(74) Attorney, Agent, or Firm — Pepper Hamilton LLP

(57) ABSTRACT

A method and system for server fault analysis are described. A server configuration analyzer retrieves event logs collected from a server with a fault such as a misconfiguration. These event logs can then be analyzed using metrics to identify one or more messages in the logs that indicate a cause of the fault on the server. Once the messages are identified, the server configuration analyzer retrieves remedial commands that may be used to correct the fault from a database that stores remedial commands correlated with event log messages. The server configuration analyzer can then present the messages and remedial commands to a user to assist with identifying the cause of the fault and correcting it.

15 Claims, 6 Drawing Sheets

(56) References Cited

U.S. PATENT DOCUMENTS

| | | | |
|---|---|---|---|
| 2012/0005542 A1* | 1/2012 | Petersen | G06F 11/0709 714/48 |
| 2012/0166883 A1* | 6/2012 | Miyazaki | G06F 11/0766 714/37 |
| 2014/0188729 A1* | 7/2014 | Hong | H04L 12/1895 705/44 |
| 2014/0244816 A1* | 8/2014 | Anerousis | H04L 41/065 709/223 |
| 2014/0281676 A1* | 9/2014 | Keshkamat | G06F 11/0709 714/5.11 |
| 2015/0236896 A1* | 8/2015 | Brown | H04L 41/0654 709/201 |

* cited by examiner

SERVER FAULT ANALYSIS SYSTEM USING EVENT LOGS

TECHNICAL FIELD

Examples described herein relate to data storage systems, and more specifically, to a system and method for configuration, performance, and fault analysis of servers and software using event logs.

BACKGROUND

With the need for data storage increasing every year, more companies and organizations are turning to computer systems specialized for data storage. As these computer storage systems become more complex, there are more opportunities to make mistakes when configuring them, especially when the storage systems run customized and proprietary operating systems and applications that customers might not be intimately familiar with. Diagnosing these misconfigurations can be difficult not only for customers, but also for trained support personnel who may not have full access to the systems located on customer premises.

These software misconfigurations are a serious obstacle for vendors selling data storage solutions and one of the major inhibitors for the enterprise level customer market. Significant downtime for a server can be costly to customers and vendors who offer service level agreements for support. Getting back to the customer with a solution to a problem faster saves time for the customer, improves the customer experience, and reduces the bottom line cost to the vendor as well. However, despite the availability of support workflow automation tools and reference guides, some server misconfigurations can take excessively long periods of time to resolve.

DETAILED DESCRIPTION

Figure 1:
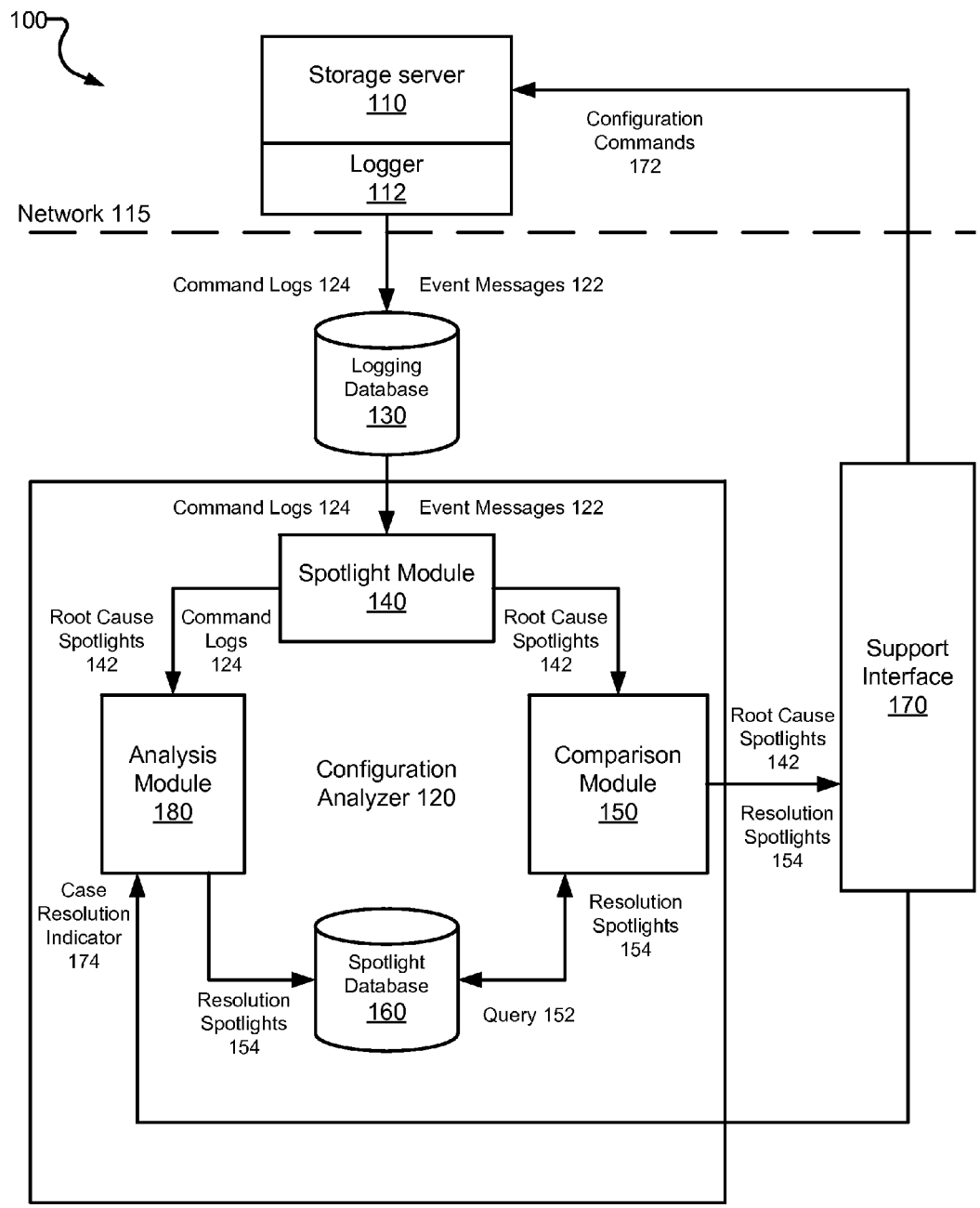
FIG. 1 illustrates an example system for server fault analysis, in accordance with some aspects.

In order for storage server vendors to more conveniently provide support to customers of their products, software on servers located at the customers' premises can be configured to periodically send system diagnostic information back to the vendor. An example of such software is AutoSupport, created by NetApp, Inc. of Sunnyvale, Calif. Some simple issues can be solved automatically or by the customers themselves, but complex server misconfigurations often require the assistance of a trained customer support engineer. The system diagnostic information from the server is useful to customer support in pinpointing the misconfiguration; however, it is time-consuming to search through a large volume of diagnostic messages to determine which ones indicate the cause of the misconfiguration and which can safely be ignored. Even once the cause is identified, it takes additional time for customer support to decide on the correct commands to properly configure the server and fix the customer's issue. Customer support is also often layered, with lesser experienced personnel escalating problems they cannot solve to their more experienced coworkers. Each one of these escalations involves duplication of effort and additional time until the customer's problem is resolved.

Examples such as described provide numerous benefits over conventional approaches. Among other benefits, examples as described reduce the time needed to complete both the process of determining the root cause of a misconfiguration, and the process for resolving the identified issue. In this regard, examples improve performance and computational efficiency of computer systems which are used to provide troubleshooting and user support.

According to one aspect, a server fault analysis system highlights logged event messages in the system diagnostic information. In addition, the system compares the highlighted messages to previous support cases to predict which commands may solve the misconfiguration. The highlighted messages and commands are referred to as root cause spotlights and resolution spotlights, respectively. The root cause spotlights can potentially help the customer support engineer understand the problem better and in many cases highlight the problem itself. The resolution spotlights can potentially give a user, administrator or customer (e.g., support engineer) a better understanding of how to resolve the problem.

In an example support resolution workflow, a case is assigned a priority once a customer opens a support ticket, P1 being the highest priority and P5 being the least. Different levels of customer support engineers are also assigned depending on the assigned priority. Naturally, P3 to P5 cases are usually assigned to novice support engineers. Case resolution service level agreements and the target time to solution provided are more relaxed for lower priority cases. However, efficiency in resolving any priority ticket is important for good customer service, which means getting the right information to support engineers as early as possible.

Absent examples as described, conventional approaches tend to be manually intensive and tedious, requiring man-hours from relatively expensive trained personnel. For example, under conventional approaches, system diagnostic messages coming from a system on which a support case has been opened are the first source of information for the support engineer. The support engineer workflow may include interaction with consulting Event Management System (EMS) logs for any harmful or unfriendly messages. Setup, installation, and best practice guides are also used as reference for any clues to the cause of the problem and its possible resolution. Often, support engineers also use tools like Workflow Flow Automators (WFA) for any setup related bugs, etc. However, despite the availability of tools and logs to support engineers, much inefficiency in the support workflow has been observed that could be improved.

For example, the average support case involves multiple escalations to higher levels of support engineers, which wastes time changing hands and increases the time to solution provided. Much of the time is spent in gathering data to determine the cause of the problem with the server, even when the necessary data is already included in the system diagnostic messages that support has access to.

Examples recognize that the root causes of misconfigurations are often found in the system diagnostic message logs; however, due to the sheer volume of logged data, support engineers sometimes request logs they already have from a customer, which adds unnecessary waiting for a reply and frustrates the customer. The typical volume of log messages for a system per day could be several million, and it's possible that the misconfiguration has existed for days or weeks before being identified and reported to support. So not only do support engineers not know what data they already have, searching through it to find relevant messages is time-consuming and difficult. Therefore, it would be useful to have a server configuration analyzer dig through the millions of logged messages to highlight potential root causes of the misconfiguration.

Furthermore, even after identifying the root cause of the misconfiguration from relevant messages, consulting guides and manuals to correctly configure the server is similarly difficult. Support engineers could benefit from seeing potential resolutions that are statistically correlated to the root cause of the misconfiguration. In combination, the root causes as well as the potential resolutions have the ability to reduce a case time to solution provided from days to minutes.

In an example, a server configuration analyzer retrieves event logs collected from a server with a fault such as a misconfiguration. These event logs can then be analyzed using metrics to identify one or more messages in the logs that indicate a cause of the fault on the server. Once the messages are identified, the server configuration analyzer retrieves remedial commands that may be used to correct the fault from a database that stores remedial commands correlated with event log messages. The server configuration analyzer can then present the messages and remedial commands to a user to assist with identifying the cause of the fault and correcting it.

In some examples, an owner or customer using the misconfigured server submits a request for help to support personnel, and support personnel use the server configuration analyzer. After the request for help has been satisfied, the server configuration analyzer can receive an indication that the misconfiguration has been corrected. The server configuration analyzer retrieves command history logs collected from the server and statistically correlates commands from the logs with a time the fault or misconfiguration was corrected using a number of criteria. The server configuration analyzer validates the commands as remedial commands by comparing them with a solution to the fault with the server and stores the validated remedial commands and associated messages together in the database. These validated remedial commands can later be retrieved and presented to support personnel when a similar misconfiguration occurs in order to reduce the time needed searching for a solution to the misconfiguration.

Statistically correlating the commands from the command history logs with the time the fault was corrected can include a number of weighted comparison criteria. These include, for example, (i) the execution of a similar command, or the same command with different attributes, near in time to the misconfiguration being corrected; (ii) execution of a new command not previously seen in the command history logs near in time to the misconfiguration being corrected; and (iii) a correlation between commands from the first two criteria and the cessation of messages in the event logs that indicated the cause of the misconfiguration. In addition, the structure of each of the commands in the command history log can be analyzed to assist in statistically correlating them with the time the fault was corrected.

Still further, some examples provide that the metrics used to identify the messages in the logs that indicate the cause of the misconfiguration can include metrics such as a time gap between successive appearances of a particular message in the logs, a number of times the particular message appears in the logs in two time periods approximately before and after the misconfiguration was reported, a change in severity level of the particular message, and a correlation between the particular message and a subsystem of the server related to the misconfiguration. In some examples, the first of the two time periods spans from approximately 45 days prior to the fault being reported to support personnel to 10 days prior to the fault being reported, and the second time period spans from an end of the first time period to the present or current time. Furthermore, analyzing the event logs using the metrics can include assigning a score to each of the messages and ranking them by score before presenting them to the user.

In some aspects, the server configuration analyzer can format or tailor the retrieved remedial commands by supplying correct arguments and parameters to match the misconfigured server. These commands can then be executed to automatically correct the misconfiguration on the server.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates a computer system within which server fault analysis can be implemented or provided. In an example shown, a server fault analysis system 100 includes storage server 110, a configuration analyzer 120, and support interface 170. When a customer or administrator of storage server 110 detects a fault, such as a misconfiguration, with the server, the customer can open a support ticket to request technical assistance. In some aspects, the fault is a misconfiguration of software or hardware on the server. In other aspects, the fault can be a performance issue or any other undesirable behavior experienced with the server. A support engineer assigned to the ticket can use the configuration analyzer 120 to provide helpful clues data mined from logs collected from the storage server 110 and potential past solutions in order to more quickly and accurately resolve the customer's problem.

In some aspects, the configuration analyzer 120 runs on a networked server managed by a vendor that provides support to the owners or administrators of the storage server 110. Support interface 170 can be provided on a separate workstation that interacts with the configuration analyzer 120, or in other aspects, support interface 170 and components of configuration analyzer 120 reside on the same physical hardware.

In one aspect, storage server 110 is a networked file server that has the primary purpose of providing a location for shared disk access, i.e. shared storage of computer files that can be accessed by the workstations attached to the same computer network. Storage server 110 can be a general purpose computer or a specialized server such as a networked-attached storage (NAS) appliance with an operating system customized for serving files. A computer appliance such as a NAS is generally a separate and discrete hardware device with integrated software specifically designed to provide a specific computing resource. These devices became known as "appliances" because of their similarity to home appliances, which are generally "closed and sealed"—not serviceable by the owner. The hardware and software are pre-integrated and pre-configured by a vendor before delivery to the customer to provide a "turn-key" solution to a particular problem, such as data storage. Unlike general purpose computers, appliances often limit customers' ability to change the software (including the underlying operating system) or to flexibly reconfigure the hardware inside the appliance. Due to the specialized hardware and software and differences from general purpose computers, customers are often less familiar with configuration options and diagnostics on such an appliance, which can lead to frustrating configuration errors and downtime. Along with selling the appliances themselves, vendors typically provide support and service level agreements to help enterprise customers configure their appliances and solve problems that arise in a timely manner. For the purposes of server fault analysis system 100, configuration analyzer 120 can be used with any computer that logs error messages and commands, and therefore storage server 110 is not intended to be limited to any particular type of computing device.

In order to help pinpoint and solve server problems and faults such as misconfigurations, storage server 110 can log system diagnostic information with a logger 112. In some aspects, logger 112 is embedded within the operating system of the storage server 110 and unobtrusively collects system diagnostic information such as event messages 122 and command logs 124. This system diagnostic information can contains dozens of sections from various subsystems of storage server 110 that highlight potential issues to the customer and vendor, which allow them to take corrective action.

In some examples, system diagnostic information is transferred over network 115 from storage server 110 back to the vendor at regular intervals of time. In addition, a fail stop event or parameter beyond a tolerance limit can trigger system diagnostic information to be shipped immediately. An audit log of the entire operating system as it serves client requests is recorded into a section of the system diagnostic information called the event management system (EMS) logs. Each software subsystem within the operating system records informational, warning, and error messages in the EMS logs as event messages 122. Certain execution paths that are treated as potentially harmful or dangerous can be logged as warnings or error messages accordingly.

Similar to the EMS logs, command logs 124 are also included in the system diagnostic information recorded by logger 112. These logs capture an audit trail of timestamped administrative commands executed on storage server 110. The user privileges and modes of command execution (whether a system console command line access, remote interface, or a graphical user interface-based web service access) are also included with the command details.

The event messages 122 and command logs 124 generated on storage server 110 can be stored in a logging database 130 that the vendor of the storage server 110 and configuration analyzer 120 can access to help solve problems with the storage server 110. In other examples, configuration analyzer 120 retrieves event messages 122 and command logs 124 from the logger 112 as needed by support personnel instead of storing large quantities of log data that may never be analyzed. The typical volume of log messages for a storage server 110 per day could be several million, and days or weeks of log data is usually stored because a misconfiguration may exist for a while before the customer identifies and reports the problem to the vendor.

Configuration analyzer 120 includes spotlight module 140, comparison module 150, spotlight database 160, and analysis module 180. The logging database 130 and spotlight database 160 can optionally be stored on the same server as the logical components of the configuration analyzer 120, or they can be reside on separate servers networked to the configuration analyzer 120. Similarly, functions of the spotlight module 140, comparison module 150, and analysis module 180 can either be executed by one or more processors on the same server or processors on separate networked servers.

Spotlight module 140 uses data mining, statistical techniques, and metrics to filter the potentially millions of event messages 122 into a small set of messages which are deemed likely related to a problem that the customer is experiencing with the storage server 110. This set of messages makes up the root cause spotlights 142, which could indicate the storage server's reaction to the misconfiguration causing the customer's problem. In some examples, the root cause spotlights 142 are limited to a few dozen key messages. Metrics the spotlight module 140 can use to filter and extract event messages 122 include a time gap between occurrences in which a particular message appears in the logs, total number of times a message has appeared in the logs, a change in the severity level of the message, and a correlation between the subsystem or the domain related to the problem as reported in the case logs to the subsystem reporting the message. In other aspects, spotlight module 140 can leverage other types of logs generated by logger 112 in the search for root cause spotlights 142, such as the command logs 124.

Once the root cause spotlights 142 are identified, the comparison module 150 can compare them to spotlights from previous problems in support cases stored in the spotlight database 160. The comparison module 150 uses root cause spotlights 142 to send a query 152 to spotlight database 160 to determine if the current root cause spotlights 142 are similar to ones that support personnel have seen before. If there is a match in the database, the comparison module 150 retrieves commands that were used to resolve the past misconfiguration from the spotlight database 160. These commands are referred to as resolution spotlights 154. The comparison module 150 sends the root cause spotlights 142 and resolution spotlights 154, if any were found, to the support interface 170. The support engineer can then resolve the misconfiguration on storage server 110 using the spotlights for reference to supplement normal diagnostic procedures and best practices.

The primary difference between the two types of spotlights is that the root cause spotlights 142 are per-system based and are immediately applicable to the problem with storage server 110. The resolution spotlights 154, on the other hand, have been mined from systems which in the past had similar root cause spotlights 142 and were likely fixed by the commands shown in the resolution spotlights 154. Since the commands were executed on a different server and may have been used to resolve a similar, but not identical misconfiguration, a support engineer may need to change some of the commands' parameters to apply to storage server 110. In some aspects, support interface 170 can include components to perform these changes automatically and reconfigure storage server 110 without human intervention.

In one example scenario, a customer opens a support ticket because of replication and authentication issues with storage server 110. Spotlight module 140 retrieves event messages 122 from the logging database 130 and highlights root cause spotlights 142 that include warnings about multiple Internet Protocol (IP) addresses registered for the same domain controller and unused network interface cards (NICs). Comparison module 150 queries spotlight database 160 for any resolution spotlights 154 associated with those warnings. As it happens, support engineers had solved that problem before by using commands to disable the unused NICs and delete invalid domain name system (DNS) records. These commands are retrieved from the spotlight database 160 and marked as resolution spotlights 154. Comparison module 150 then presents the root cause spotlights 142 and resolution spotlights 154 to a support engineer on the support interface 170.

From the support interface 170, a support engineer can issue configuration commands 172 to the storage server 110 across network 115. In some examples, support engineers reconfigure servers remotely over the Internet, but it is also possible to issue configuration commands 172 to the storage server 110 locally if necessary. These configuration commands 172 can be entered using a command-line interface such as secure shell or through a graphical user interface. Besides displaying spotlights, the support interface 170 can also include information to help support engineers resolve the misconfiguration, such as details about the customer and the storage server 110, notes created by support engineers or the customer, etc.

Once a support engineer has resolved the fault with storage server 110, the support interface 170 can be used to close the support case and issue a case resolution indicator 174 to the analysis module 180. The analysis module 180 statistically correlates the support case closure (i.e., resolution of the misconfiguration with storage server 110) to execution of commands in the command logs 124. Commands that are deemed to have contributed to the case closure are stored in the spotlight database 160 as resolution spotlights 154. In addition, the root cause spotlights 142 associated with the case are stored together with the resolution spotlights 154 so that future database queries for the root cause spotlights 142 return the resolution spotlights 154 that were used to resolve the misconfiguration.

In one example, analysis module 180 retrieves command logs 124 and root cause spotlights 142 associated with the support case from the spotlight module 140. In other examples, analysis module 180 can retrieve the command logs 124 from the logging database 130 or directly from the logger 112. Since the resolution spotlights 154 likely consist of configuration commands 172 entered by support engineers or potentially from a customers' own commands sent to the storage server 110 after the support case was opened, the command logs 124 from the time the support case was opened are not sufficient. Therefore, before performing the statistical correlation to identify resolution spotlights 154, analysis module 180 can request new command logs 124 or wait until the logger 112 automatically transfers them to the configuration analyzer 120. Once the analysis module 180 has command logs 124 from the time period between the support case being opened and closed, all of the logs can be analyzed to identify resolution spotlights 154.

Methodology

Figure 2:
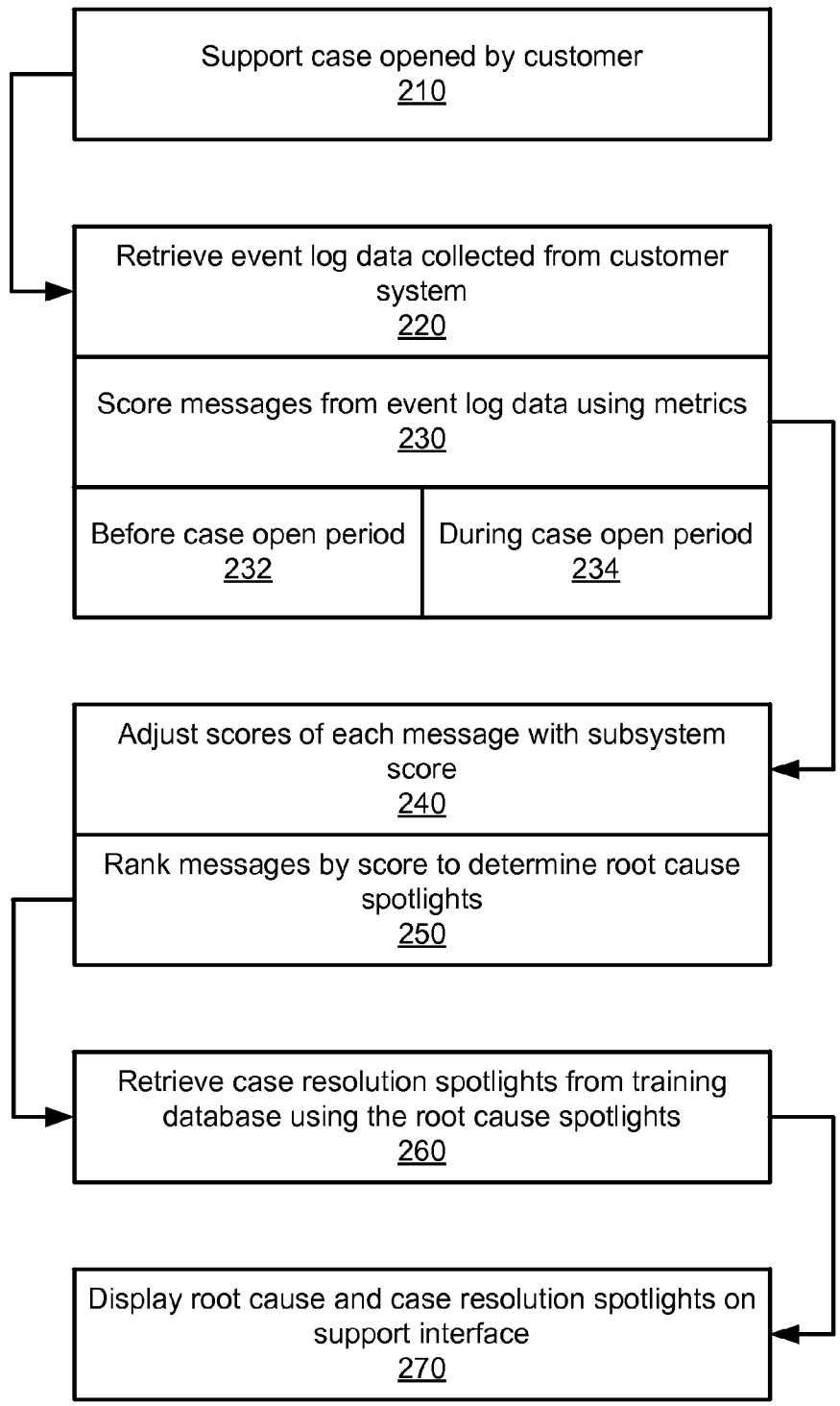
FIG. 2 illustrates an example method for identifying log messages and commands to assist in diagnosing and correcting server faults.
Figure 3:
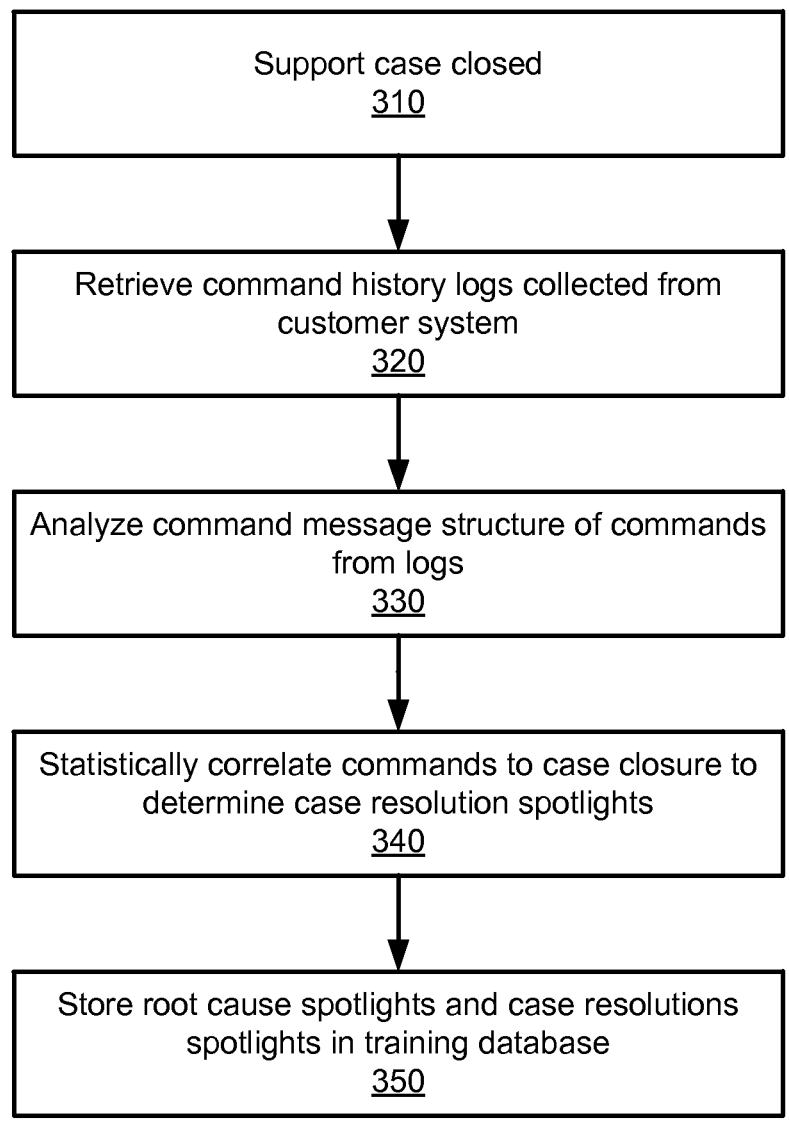
FIG. 3 illustrates an example method for correlating log messages and commands used to correct server faults.
Figure 4:
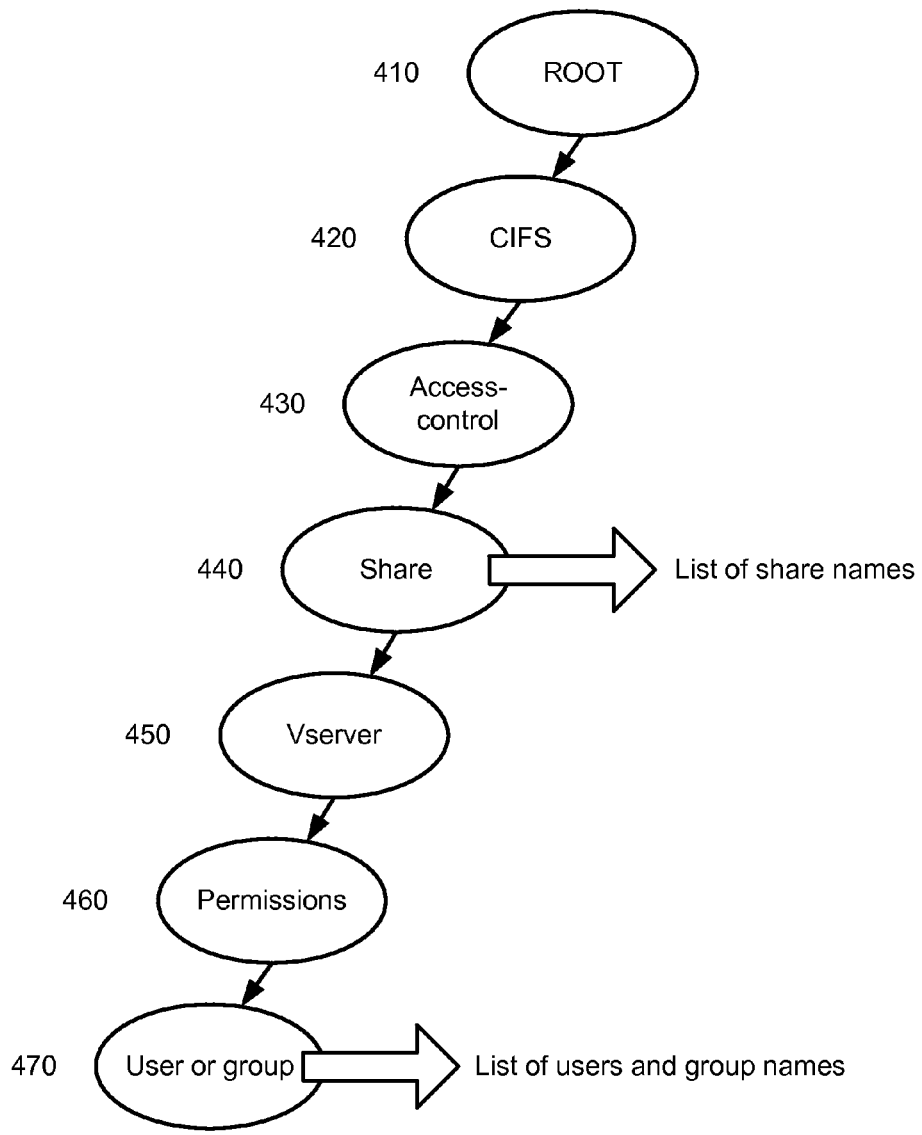
FIG. 4 illustrates a graph of an example command from a command history log.
Figure 5:
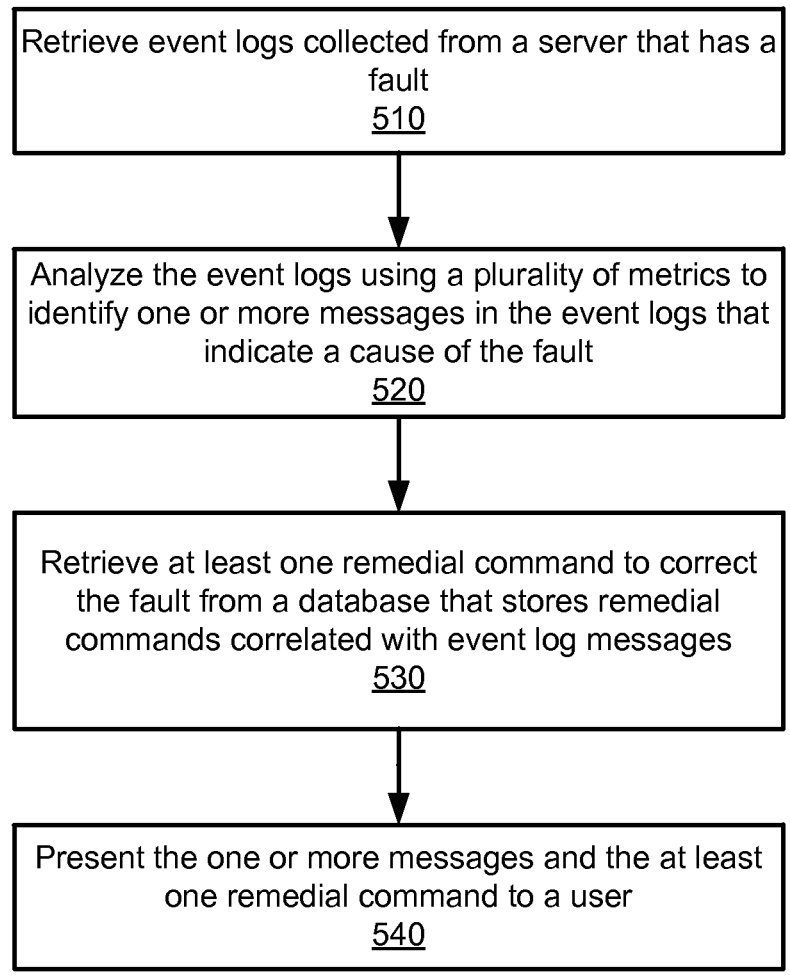
FIG. 5 illustrates an example method for server fault analysis, in accordance with some aspects.

FIG. 2 illustrates an example method for identifying log messages and commands to assist in diagnosing and correcting server faults. FIG. 3 illustrates an example method for correlating log messages and commands used to correct server faults. FIG. 4 illustrates the structure of an example command 400 from a command history log. FIG. 5 illustrates an example method for server fault analysis, in accordance with some aspects. While operations of examples of FIGS. 2 through 5 are illustrated in context of specific components, modules or systems of the server fault analysis system 100, it will be appreciated that these operations need not necessarily be performed by the specific components identified, and could be performed by a variety of components and modules, potentially distributed over a number of machines. Accordingly, references may be made to elements of server fault analysis system 100 for the purpose of illustrating suitable components or elements for performing a step or sub step being described. Alternatively, at least certain ones of the variety of components and modules described in server fault analysis system 100 can be arranged within a single hardware, software, or firmware component. It will also be appreciated that some of the steps of this method may be performed in parallel or in a different order than illustrated.

With reference to an example of FIG. 2, an owner, administrator, or customer of a server opens a support case to request technical assistance in resolving a fault with the server (210). In some aspects, the fault is a misconfiguration of software or hardware on the server. In other aspects, the fault can be a performance issue or any other undesirable behavior experienced with the server. With reference to FIG. 1, the server can be storage server 110, and a vendor or manufacturer of storage server 110 provides the requested technical assistance through support interface 170 with the help of the configuration analyzer 120.

In order to pinpoint and solve server problems such as misconfigurations, storage server 110 can log system diagnostic information with logger 112, which collects system diagnostic information that highlights potential issues to the customer and support engineers. However, the system diagnostic information can consist of millions of messages that are too time-consuming to efficiently search. Furthermore, once the cause of the misconfiguration is found, providing a solution that resolves the misconfiguration can be a long process. To reduce the time needed to identify and resolve server problems, support engineers can use configuration analyzer 120 to data mine and statistically correlate the system diagnostic information to produce concise sets of spotlights. These root cause spotlights 142 and resolution spotlights 154 can be useful time-saving resources.

After the support case is opened, spotlight module 140 retrieves event log data collected from the storage server 110 (220). Event messages 122 and command logs 124 within the data can be regularly sent from the storage server 110 and stored in a logging database 130 that the vendor of the storage server 110 and configuration analyzer 120 can access. Due to the large volume of logged data, it is helpful to identify the time period relevant to the misconfiguration and only retrieve logs from that time period and a number of weeks before. In some examples, the customer submits a case inspection time with the support request that indicates approximately when the misconfiguration was first detected or known to exist. Otherwise, a default time period such as 1.5 months before the case was opened is chosen.

Spotlight module 140 tags and categorizes each of the event messages 122 as occurring either before the case open period or during the case open period. In some examples, since the misconfiguration may have existed for a while before a customer opened the support case, the period during case open can include from the 10 days prior to the customer actually submitting a support ticket to the present (234). In these examples, spotlight module 140 can define the period before case open as the case inspection time the customer submitted (or the default of 45 days before the support case was opened) until 10 days before the support case was opened (232). Spotlight module 140 uses metrics to assign scores to each message, which determine which of them qualify as root cause spotlights 142 (230). Some example metrics have been identified that can indicate the relevancy of a specific message in the logs to a misconfiguration.

One example metric is the frequency at which a particular message appears in the logs can be important. That is, the time gap between two successive occurrences of the same or a similar message. In addition, the frequencies of the message before the support case is opened and since the case has been opened are compared. For each message, a map is kept of the time distance between its consecutive arrival both before and during the case open period, which can be denoted as AvgFrequencyBefore and AvgFrequencyDuring.

Another metric is the number of times a message has appeared in the logs both before and since the case has been opened is counted. For each message, a map is also kept of the total number of times the message arrives both before and during the case open period, which can be denoted as AvgCountBefore and AvgCountDuring. Frequency and count metrics are not independent; however, for messages which are less likely to be the reason for the misconfiguration, the count may be high but appear at a constant frequency. These types of messages often indicate a benign warning that does not interfere with the server's normal operation. Spotlight module 140 can maintain separate priority queues for the messages appearing before and during the case open period. In the respective queues, messages with higher frequency and count are rated higher, messages with higher count and lower frequency are ranked lower, and ones with higher frequency only are ranked lowest.

In addition, any change in the severity level of the message is recorded. For example, if a warning message from before the case was opened suddenly becomes an error message, the message may have informed and triggered the customer to open the support case. In scoring the messages, spotlight module 140 can raise the score of the message in the both of the queues if the message severity level increases. By default, messages of type error are ranked higher than warnings, and informational messages are ignored entirely.

Moreover, the subsystem reporting the message is identified and compared to the subsystem or domain related to the problem described by the customer. In addition, a higher score can be assigned to messages from subsystems reporting large numbers of messages. For example, if the total number of error messages coming out of the NFS subsystem is higher than the number coming from the disk or the RAID subsystem, then NFS messages can be scored higher.

Spotlight module 140 calculates the group score of each message after parsing all of the event messages 122 and adjusts each message's score by multiplying it by the group score (240). In some examples, the group score is calculated on the basis of the total number of messages coming from a particular subsystem. If i is the index of the subsystem where n total subsystems have appeared in the logs analyzed by spotlight module 140, $n_{si}$ represents the total number of messages appearing from the subsystem i. N is the total number of messages across all observed subsystems in the logs. ($Score_{si}=n_{si}/N$) where (Sum ($Score_{si}$)=1). The score of a message belonging to a group i is calculated as ((1+$Score_{si}$)*$OrigScore_{si}$) where $OrigScore_{si}$ is the message's score after the other metrics have been applied.

After messages scores are calculated, spotlight module 140 ranks the messages by score and identifies the highest ranked ones as root cause spotlights 142 (250). In some examples, the root cause spotlights 142 are organized under the categories "before the case opening" and "during the Case open period."

Once the root cause spotlights 142 are identified, the comparison module 150 can compare them to spotlights from previous problems in support cases stored in the spotlight database 160. The comparison module 150 uses root cause spotlights 142 to send a query 152 to spotlight database 160 to determine if the current root cause spotlights 142 are similar to ones that support personnel have seen before. If there is a match in the database, the comparison module 150 retrieves commands that were used to resolve the past misconfiguration from the spotlight database 160 (260). These commands are referred to as resolution spotlights 154. The comparison module 150 sends the root cause spotlights 142 and resolution spotlights 154, if any were found, to the support interface 170 (270). The support engineer can then resolve the misconfiguration on storage server 110 using the spotlights for reference to supplement normal diagnostic procedures and best practices.

With reference to an example of FIG. 3, once a support engineer has resolved the misconfiguration with storage server 110, the engineer can close the support case and issue a case resolution indicator 174 to the analysis module 180 through, for example, support interface 170 as described with FIG. 1 (310). Typically, before the support case is opened and while the case is open, the customer configures and reconfigures the system by executing specific commands. These commands may or may not give a clue to the cause of the misconfiguration. After all, it is possible that the customer or even sometimes the support engineers misunderstand and falsely assume a problem is related to a particular configuration or a software subsystem. To better determine which commands may be relevant, the analysis module 180 statistically correlates the support case closure (i.e., resolution of the misconfiguration with storage server 110) to execution of commands in the command logs 124.

In one example, analysis module 180 retrieves command logs 124 and root cause spotlights 142 associated with the support case from the spotlight module 140. In other examples, analysis module 180 can retrieve the command logs 124 from the logging database 130 or directly from the logger 112 (320). Since the resolution spotlights 154 likely consist of configuration commands 172 entered by support engineers or potentially from a customers' own commands sent to the storage server 110 after the support case was opened, the command logs 124 from the time the support case was opened are not sufficient. Therefore, before performing the statistical correlation to identify resolution spotlights 154, analysis module 180 can request new command logs 124 or wait until the logger 112 automatically transfers them to the configuration analyzer 120. Once the analysis module 180 has command logs 124 from the time period between the support case being opened and closed, all of the logs can be analyzed to identify resolution spotlights 154 (330).

Identifying resolution spotlights 154 in the commands is not necessarily easy because, due to the structure of the commands, the same command executed twice can have many differences. To account for these differences, analysis module 180 can analyze each command from the command logs 124 as a structured message to separate and compare arguments and options (330).

Once the command structure is analyzed, the analysis module 180 can statistically correlate the support case closure to execution of commands (340). Some example metrics or criteria have been identified that can indicate the relevancy of a specific command in the logs to the misconfiguration. For example, one criterion is whether a similar or the same command is executed with different key/value attributes around the time when the case is closed. This can indicate that there was an incorrect or missing argument in the earlier execution of the command which led to the misconfiguration, and then the case was closed once the command was executed correctly. Another criterion is the execution of a completely new command around the time when the case is closed which does not exist earlier in the command log. Commands identified using either of these criteria can be correlated with the disappearance of either an error message or one of the root cause spotlights 142 obtained from the spotlight module 140.

In some aspects, analysis module 180 compares the identified commands with a solution to the misconfiguration of storage server 110 in order to validate the identified commands. In one example, support personnel can include details of such a solution with the case resolution indicator 174 in a format that analysis module 180 can parse. In another example, support interface 170 is used to perform any necessary validation.

Commands that are deemed to have contributed to the case resolution are stored in the spotlight database 160 as resolution spotlights 154. In some aspects, the resolution spotlights 154 are commands that analysis module 180 identified and successfully validated. In addition, the root cause spotlights 142 associated with the case are stored together with the resolution spotlights 154 so that future database queries for the root cause spotlights 142 return the resolution spotlights 154 that were used to resolve the misconfiguration (350).

Example Command

FIG. 4 illustrates a graph of an example command 400 from a command history log. Identifying resolution spotlights 154 in the commands can be difficult because, due to the structure of the commands, the same command executed twice can have many differences. For example, two instances of the same command could potentially differ in terms of the system on which they executed, the instance of the object on which they are executed, the properties and values of any arguments used, and the privilege level of the user who executed each command. To account for these possibilities, analysis module 180 can analyze each command from the command logs 124 as a structured message to separate and compare arguments and options.

Example command 400 obtained from a command history log has the following format:

cifs share access-control modify-share<foo>-vserver<bar>-permission<Change>-user-or-group<Everyone>

The structure can be derived by considering every identifier prefixed with "-" as the property and the ones within the brackets as the values. Analysis module 180 can add every command seen in the window of observation to a graph rooted at ROOT 410. Duplicate executions of the command increment the counter for each graph node. The values that differ are added them to the special list data structure of the corresponding node.

Example command 400 modifies an access control list of the common internet file system (CIFS) subsystem. Breaking down the structure of the command, the system in question is ROOT 410 and the subsystem is CIFS 420. The function is to modify access-control 430. The -share<foo> is an object and specifies the name of the CIFS share 440 access control list that is being modified. Further CIFS share access-control modify commands found in the log that act on different share objects can be added to the list of share names attached to the share 440 node. The -vserver<bar> parameter is a path that specifies the name of the Vserver (virtual server) 450 containing the CIFS share. The -permission property specifies the permissions 460 for the user or group being modified, and the -user-or-group parameter specifies the user or group 470 whose permissions are going to be modified.

The graph representation as described can be used by analysis module 180 to determine, among other things, which commands were executed exclusively after the support case was opened, which of the commands changed argument values after the case was opened, and which commands modified their arguments/parameters after the case was opened. For example, two volume creation commands may be found in the logs: one before the support case was opened and a second with an additional parameter called "gateway" specified. If the support case was closed soon after the second volume creation command, it could indicate that the second command was a resolution to the misconfiguration, and the second command may be chosen as a resolution spotlight 154.

FIG. 5 illustrates an example method for server configuration analysis. In some aspects, event logs collected from a server that has a misconfiguration are retrieved (510). The event logs can then be analyzed using a plurality of metrics to identify one or more messages that indicate a cause of the misconfiguration (520). Once identified, at least one remedial command to correct the misconfiguration can be retrieved from a database that stores remedial commands correlated with event log messages (530). The one or more messages and the at least one remedial command can then be presented to a user (540).

Computer System

Figure 6:
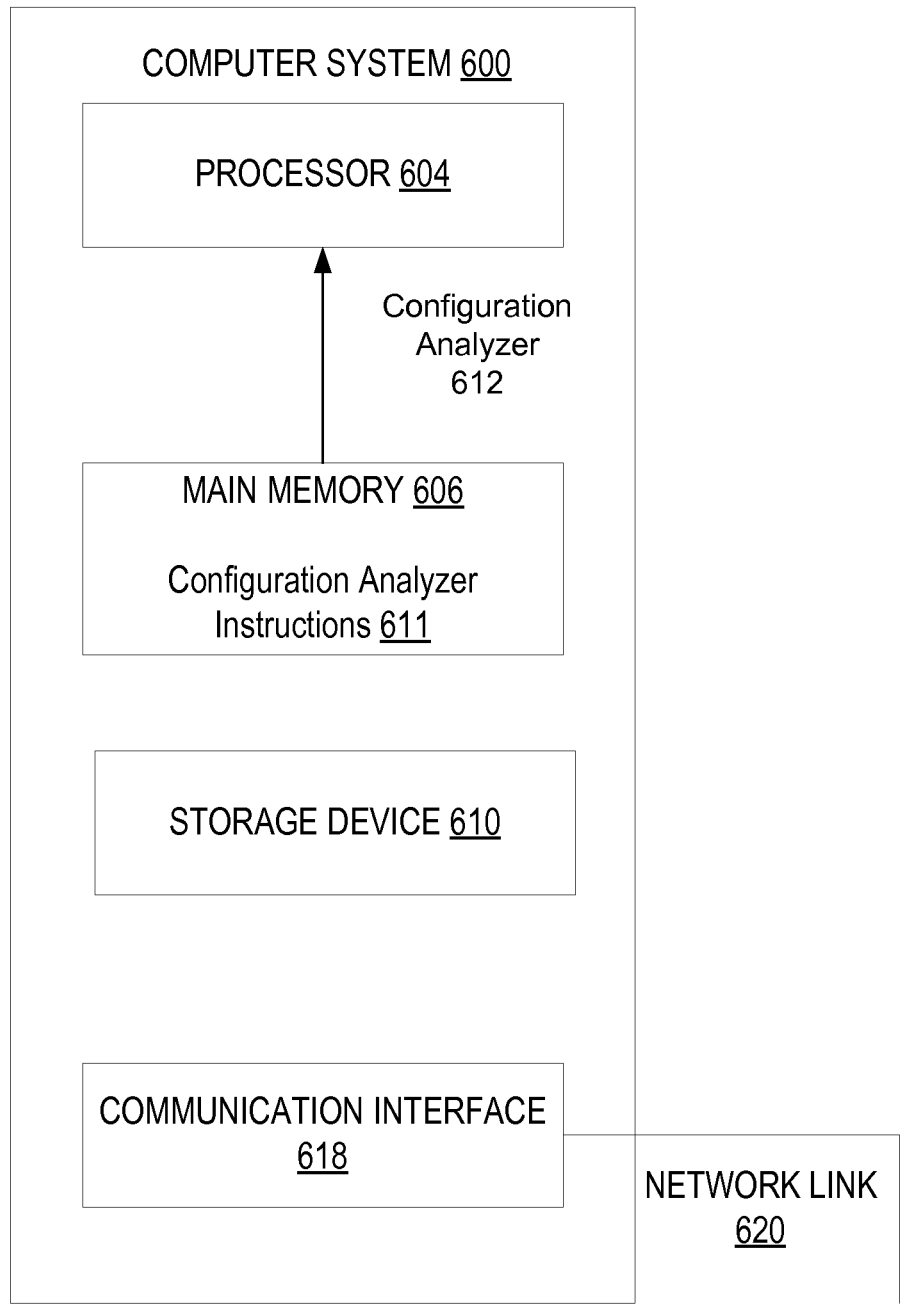
FIG. 6 is a block diagram that illustrates a computer system upon which aspects described herein may be implemented.

FIG. 6 is a block diagram that illustrates a computer system upon which aspects described herein may be implemented. For example, in the context of FIG. 1, server fault analysis system 100 may be implemented using one or more servers such as described by FIG. 6.

In an example, computer system 600 includes processor 604, main memory 606 (including a non-transitory computer-readable medium), storage device 610, and communication interface 618. The processor 604 executes instructions 611 to provide a configuration analyzer 612. The configuration analyzer 612 can, for example, be used to implement functionality such as described with configuration analyzer 120 of server fault analysis system 100. Computer system 600 includes at least one processor 604 for processing information. Computer system 600 also includes the main memory 606, such as a random access memory (RAM) or other dynamic storage device, as a memory resource for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. The storage device 610, such as a magnetic disk or optical disk, is provided for storing information and instructions. The communication interface 618 may enable the computer system 600 to communicate with one or more networks through use of the network link 620 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 600 for implementing the techniques described herein. According to one aspect, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an example, can be combined with other individually described features, or parts of other aspects. Thus, absence of describing combinations should not preclude the inventor(s) from claiming rights to such combinations.

What is claimed is:

1. A computing device, comprising:
a memory containing a machine readable medium comprising machine executable code having stored thereon instructions for efficient resolution of server faults based on an optimized statistical analysis of diagnostic data; and
one or more processors coupled to the memory, the processors configured to execute the machine executable code to:
retrieve one or more event logs comprising a plurality of messages captured during operation of a server that has experienced a fault;
identify one of the messages that indicates a cause of the fault based on a ranking of scores assigned to the messages, wherein the one of the messages originates from one of a plurality of server subsystems and one of the scores assigned to the one of the messages is adjusted prior to the ranking based on a group score for the one of the server subsystems determined based on a ratio of a total number of the messages originating from the one of the server subsystems and a total number of the messages originating from the server subsystems; and
execute a command to automatically correct the fault in the server, wherein the command is retrieved based on a stored statistical correlation with the one of the messages.

2. The computing device of claim 1, wherein the one or more processors are further configured to execute the machine executable code to statistically correlate one or more commands from one or more command history logs with a time the fault was corrected using one or more criteria.

3. The computing device of claim 2, wherein the one or more processors are further configured to execute the machine executable code to store the command and the one of the messages together in a database when the command is validated as a remedial command based on a comparison of the command with a solution to the fault.

4. The computing device of claim 1, wherein the one or more metrics comprise an event log message time gap, an event log message frequency, a change in event log message severity level, or an event log message correlation with a subsystem of the server related to the fault.

5. The computing device of claim 4, wherein the event log message frequency is based on a number of appearances in one or more of the event logs during a first time period and a second time period, the first time period spans from a first number of days prior to the fault being reported to a second number of days prior to the fault being reported, and the second number of days comprises fewer days than the first number of days and the second time period spans from an end of the first time period to a current time.

6. A method, comprising:
retrieving, by a computing device, one or more event logs comprising a plurality of messages captured during operation of a server that has experienced a fault;
identifying, by the computing device, one of the messages that indicates a cause of the fault based on a ranking of scores assigned to the messages, wherein the one of the messages originates from one of a plurality of server subsystems and one of the scores assigned to the one of the messages is adjusted prior to the ranking based on a group score for the one of the server subsystems determined based on a ratio of a total number of the messages originating from the one of the server subsystems and a total number of the messages originating from the server subsystems; and executing, by the computing device, a command to automatically correct the fault in the server, wherein the command is retrieved based on a stored statistical correlation with the one of the messages.

7. The method of claim 6, further comprising statistically correlating, by the computing device, one or more commands from one or more command history logs with a time the fault was corrected using one or more criteria.

8. The method of claim 7, further comprising storing, by the computing device, the command and the one of the messages together in a database when the command is validated as a remedial command based on a comparison of the command with a solution to the fault.

9. The method of claim 6, wherein the one or more metrics comprise an event log message time gap, an event log message frequency, a change in event log message severity level, or an event log message correlation with a subsystem of the server related to the fault.

10. The method of claim 9, wherein the event log message frequency is based on a number of appearances in one or more of the event logs during a first time period and a second time period, the first time period spans from a first number of days prior to the fault being reported to a second number of days prior to the fault being reported, and the second number of days comprises fewer days than the first number of days and the second time period spans from an end of the first time period to a current time.

11. A non-transitory machine readable medium having stored thereon instructions for efficient resolution of server faults based on an optimized statistical analysis of diagnostic data comprising machine executable code which when executed by at least one machine causes the machine to:

retrieve one or more event logs comprising a plurality of messages captured during operation of a server that has experienced a fault;

identify one of the messages that indicates a cause of the fault based on a ranking of scores assigned to the messages, wherein the one of the messages originates from one of a plurality of server subsystems and one of the scores assigned to the one of the messages is adjusted prior to the ranking based on a group score for the one of the server subsystems determined based on a ratio of a total number of the messages originating from the one of the server subsystems and a total number of the messages originating from the server subsystems; and execute a command to automatically correct the fault in the server, wherein the command is retrieved based on a stored statistical correlation with the one of the messages.

12. The non-transitory computer-readable medium of claim 11, wherein the machine executable code when executed by the at least one machine further causes the machine to statistically correlate one or more commands from one or more command history logs with a time the fault was corrected using one or more criteria.

13. The non-transitory machine readable medium of claim 12, wherein the machine executable code when executed by the at least one machine further causes the machine to store the command and the one of the messages together in a database when the command is validated as a remedial command based on a comparison of the command with a solution to the fault.

14. The non-transitory machine readable medium of claim 11, wherein the one or more metrics comprise an event log message time gap, an event log message frequency, a change in event log message severity level, or an event log message correlation with a subsystem of the server related to the fault.

15. The non-transitory machine readable medium of claim 14, wherein the event log message frequency is based on a number of appearances in one or more of the event logs during a first time period and a second time period, the first time period spans from a first number of days prior to the fault being reported to a second number of days prior to the fault being reported, and the second number of days comprises fewer days than the first number of days and the second time period spans from an end of the first time period to a current time.

* * * * *